US012647238B2

(12) United States Patent
Matsumura et al.

(10) Patent No.: US 12,647,238 B2
(45) Date of Patent: Jun. 2, 2026

(54) TERMINAL, RADIO COMMUNICATION METHOD, BASE STATION, AND SYSTEM FOR DETERMINING TCI STATE

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 433 days.

(21) Appl. No.: 18/042,926

(22) PCT Filed: Aug. 17, 2021

(86) PCT No.: PCT/JP2021/030023
§ 371 (c)(1),
(2) Date: Feb. 24, 2023

(87) PCT Pub. No.: WO2022/044883
PCT Pub. Date: Mar. 3, 2022

(65) Prior Publication Data
US 2023/0300824 A1 Sep. 21, 2023

(30) Foreign Application Priority Data

Aug. 28, 2020 (JP) ................................. 2020-144803

(51) Int. Cl.
*H04L 5/00* (2006.01)
*H04W 72/21* (2023.01)
(Continued)

(52) U.S. Cl.
CPC ........... *H04L 5/0091* (2013.01); *H04W 72/21* (2023.01); *H04W 72/231* (2023.01); *H04W 72/232* (2023.01)

(58) Field of Classification Search
CPC .. H04L 5/0091; H04W 72/21; H04W 72/231; H04W 72/232
See application file for complete search history.

(56) References Cited

U.S. PATENT DOCUMENTS

| 2021/0184819 A1 | 6/2021 | Takeda et al. | |
| 2021/0195583 A1* | 6/2021 | Venugopal | ............ H04L 5/0048 |

(Continued)

FOREIGN PATENT DOCUMENTS

| WO | WO-2018232090 A1 * | 12/2018 | ........... H04B 7/0626 |
| WO | 2020/044409 A1 | 3/2020 | |

(Continued)

OTHER PUBLICATIONS

International Search Report issued in PCT/JP2021/030023 on Oct. 26, 2021 (2 pages).

(Continued)

*Primary Examiner* — Kevin C. Harper
(74) *Attorney, Agent, or Firm* — Osha Bergman Watanabe & Burton LLP

(57) ABSTRACT

A terminal according to an aspect of the present disclosure includes: a receiver that receives a list of transmission configuration indication (TCI) states applicable to downlink and uplink; and a controller that determines one or more sets of active TCI states from the list based on one or more medium access control-control elements (MAC CEs), and determines one or more TCI states to be applied to at least one of downlink and uplink signals from the one or more sets based on downlink control information (DCI). According to one aspect of the present disclosure, the TCI state is appropriately controlled.

8 Claims, 10 Drawing Sheets

DL/UL TCI STATES SET BY RRC

SSB/ CSI-RS/ SRS

DL/UL TCI STATES ACTIVATED BY MAC CE

TCI STATE INSTRUCTED BY DCI

APPLIES TO DL AND UL CHANNELS (CSI-RS/PDCCH/PDSCH/PUCCH/PUSCH)

(51) Int. Cl.
   H04W 72/231 (2023.01)
   H04W 72/232 (2023.01)

(56) References Cited

U.S. PATENT DOCUMENTS

| | | | |
|---|---|---|---|
| 2021/0360594 A1* | 11/2021 | Park | H04L 5/0048 |
| 2022/0039129 A1 | 2/2022 | Takeda et al. | |
| 2022/0345272 A1* | 10/2022 | Guo | H04W 72/20 |
| 2022/0377622 A1* | 11/2022 | Zhang | H04W 36/0058 |

FOREIGN PATENT DOCUMENTS

| | | |
|---|---|---|
| WO | 2020054036 A1 | 3/2020 |
| WO | 2020/170444 A1 | 8/2020 |

OTHER PUBLICATIONS

Written Opinion of the International Searching Authority issued in PCT/JP2021/030023 on Oct. 26, 2021 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Japanese Patent Application No. 2022-544475, dated Feb. 4, 2025 (8 pages).
Office Action issued in Chinese Application No. 202180072476.4; Dated Jul. 9, 2025 (14 pages).
Office Action issued in Chinese Patent Application No. 202180072476.4; Dated Nov. 19, 2025 (14 pages).

* cited by examiner

DL/UL TCI STATES SET BY RRC

SSB/ CSI-RS/ SRS

DL/UL TCI STATES ACTIVATED BY MAC CE

TCI STATE INSTRUCTED BY DCI

APPLIES TO DL AND UL CHANNELS (CSI-RS/PDCCH/PDSCH/PUCCH/PUSCH)

TERMINAL, RADIO COMMUNICATION METHOD, BASE STATION, AND SYSTEM FOR DETERMINING TCI STATE

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). Furthermore, the specifications of LTE-Advanced (3GPP Rel. 10 to 14) have been drafted for the purpose of further increasing capacity and advancement of LTE (third generation partnership project (3GPP) release (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In a future radio communication system (for example, NR), control by a user terminal (terminal, a user terminal, User Equipment (UE)) of transmission/reception processing on the basis of information (QCL assumption/Transmission Configuration Indication (TCI) state/spatial relation) regarding Quasi-Co-Location (QCL) is being studied.

However, there are cases where information regarding the QCL is not clear. If the information regarding the QCL is not clear, there is a possibility of causing a decrease in communication quality, a decrease in throughput, and the like.

Therefore, an object of the present disclosure is to provide a terminal, a radio communication method, and a base station that appropriately determine a TCI state.

Solution to Problem

A terminal according to an aspect of the present disclosure includes: a receiver that receives a list of transmission configuration indication (TCI) states applicable to downlink and uplink; and a controller that determines one or more sets of active TCI states from the list based on one or more medium access control-control elements (MAC CEs), and determines one or more TCI states to be applied to at least one of downlink and uplink signals from the one or more sets based on downlink control information (DCI).

Advantageous Effects of Invention

According to one aspect of the present disclosure, the TCI state can be appropriately determined.

DESCRIPTION OF EMBODIMENTS

TCI, Spatial Relation, and QCL

Figure 1:
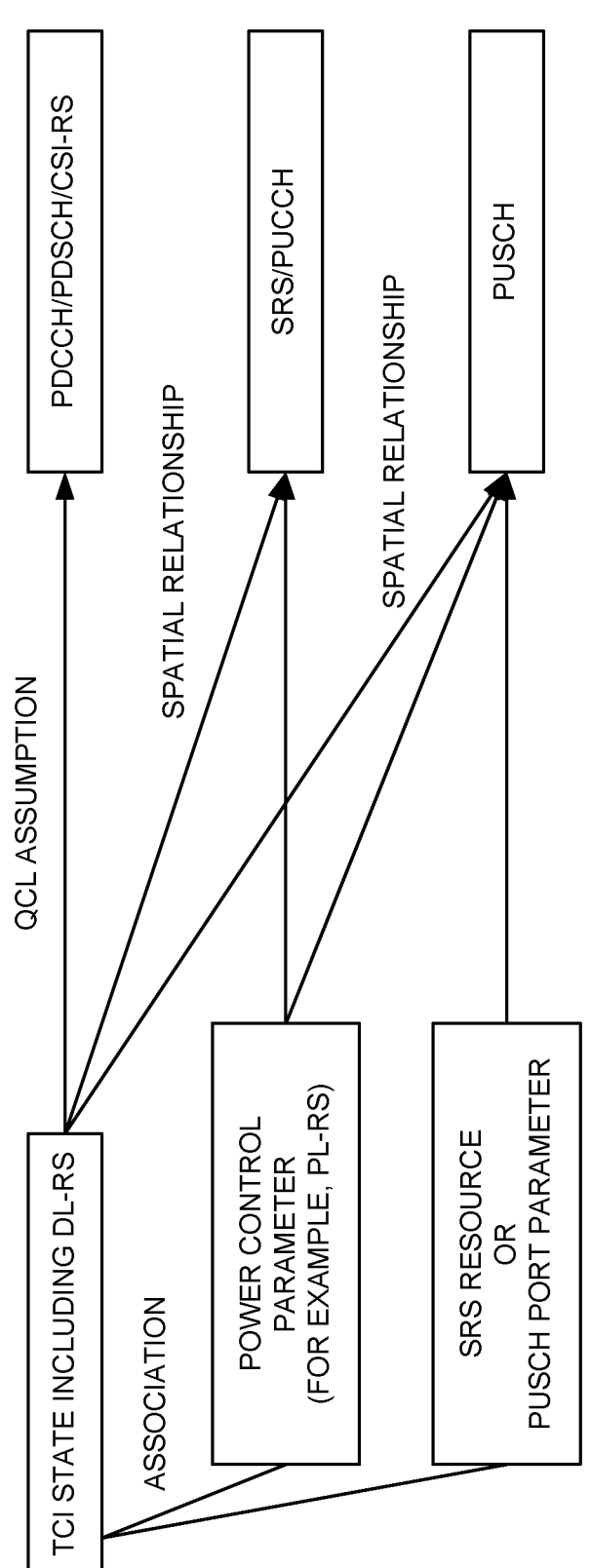
FIG. 1 is a diagram illustrating an example of a unified TCI framework.

In NR, controlling reception processing (for example, at least one of reception, demapping, demodulation, and decoding) and transmission processing (for example, at least one of transmission, mapping, precoding, modulation, and coding) in the UE of a signal and/or a channel (expressed as a signal/channel) on the basis of a transmission configuration indication state (TCI state) is being studied.

The TCI state may represent what is applied to a downlink signal/channel. A state corresponding to the TCI state applied to an uplink signal/channel may be expressed as a spatial relation.

The TCI state is information regarding a quasi-co-location (QCL) of the signal/channel, and may also be referred to as a spatial Rx parameter, spatial relation information, or the like. The TCI state may be configured in the UE for each channel or each signal.

The QCL is an indicator indicating a statistical property of a signal/channel. For example, this may mean that, when a certain signal/channel and another signal/channel have a QCL relation, it may be assumed that at least one of a Doppler shift, a Doppler spread, an average delay, a delay spread, and a spatial parameter (for example, a spatial Rx parameter) is the same (the QCL for at least one of the foregoing) for the plurality of different signals/channels.

Note that a spatial Rx parameter may correspond to a UE reception beam (for example, a reception analog beam), and the beam may be specified based on a spatial QCL. A QCL (or at least one element of the QCL) in the present disclosure is interchangeable with a spatial QCL (sQCL).

A plurality of types (QCL types) of QCL may be defined. In one example, four QCL types A to D of different parameters (or parameter sets) that are assumable to be identical can be provided, and the parameters (also referred to as QCL parameters) are shown below:

QCL type A (QCL-A): Doppler shift, Doppler spread, average delay, and delay spread;

QCL Type B (QCL-B): Doppler shift and Doppler spread;

QCL type C (QCL-C): Doppler shift and average delay; and

QCL type D (QCL-D): Spatial Rx parameter.

It may be referred to as a QCL assumption for the UE to assume that a certain control resource set (CORESET), channel, or reference signal has a specific QCL (for example, QCL type D) relation with another CORESET, channel, or reference signal.

The UE may also determine at least one of a Tx beam and a reception beam (Rx beam) of a signal/channel based on a TCI state of the signal/channel or the QCL assumption.

The TCI state may be, for example, information regarding the QCL of a target channel (in other words, a reference signal (RS) for the channel) and another signal (for example, another RS). The TCI state may be configured (indicated) by higher layer signaling, physical layer signaling, or a combination thereof.

The physical layer signaling may be, for example, Downlink Control Information (DCI).

A channel for which a TCI state or spatial relation is configured (specified) may be, for example, at least one of a Physical Downlink Shared Channel (PDSCH), a Physical Downlink Control Channel (PDCCH), a Physical Uplink Shared Channel (PUSCH), and a Physical Uplink Control Channel (PUCCH).

Furthermore, an RS having a QCL relation with the channel may be, for example, at least one of a Synchronization Signal Block (SSB), a Channel State Information Reference Signal (CSI-RS)), a measurement reference signal (Sounding Reference Signal (SRS)), a tracking CSI-RS (also referred to as a Tracking Reference Signal (TRS)), and a QCL detection reference signal (also referred to as a QRS).

The SSB is a signal block including at least one of a primary synchronization signal (PSS), a secondary synchronization signal (SSS), and a broadcast channel (physical broadcast channel (PBCH)). The SSB may be referred to as an SS/PBCH block.

An RS of QCL type X in a TCI state may mean an RS in a QCL type X relation with (DMRS of) a certain channel/signal, and this RS may be referred to as a QCL source of QCL type X in the TCI state.

Unified TCI Framework

The use of the same TCI state for both UL and DL channels has been considered.

In the example of FIG. 1, a TCI state including the DL-RS is used for the QCL assumption of PDCCH/PDSCH/CSI-RS, a spatial relationship of SRS/PUCCH, and a spatial relationship of PUSCH.

It has been studied that RRC/MAC-CE/DCI is used to select one TCI state for UL/DL.

Figure 2:
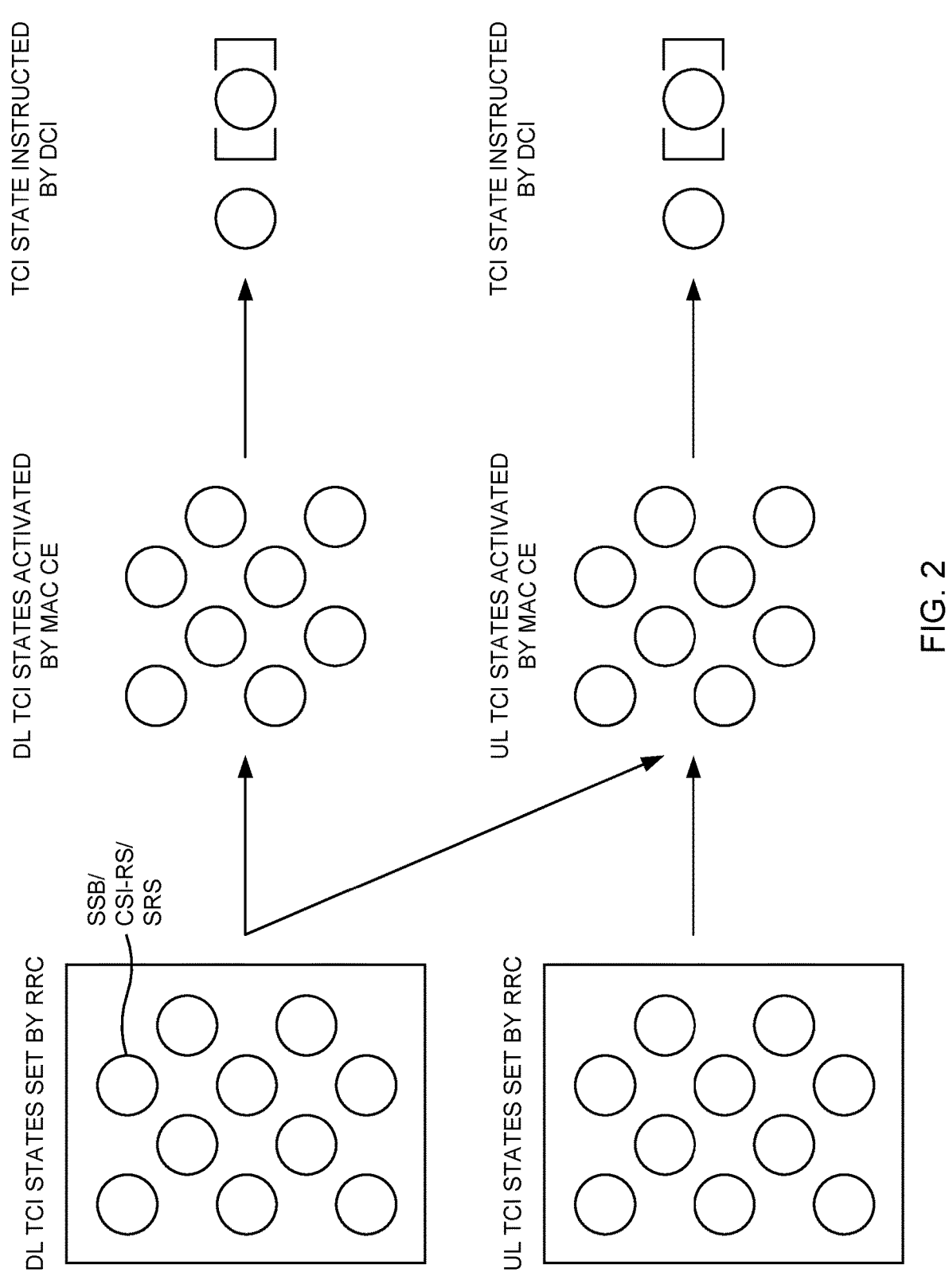
FIG. 2 is a diagram illustrating an example of a method of notifying a unified TCI state.

In the example of FIG. 2, a plurality of DL unified TCI states are set by RRC, and a plurality of UL unified TCI states are set by RRC. Each of the plurality of DL unified TCI states and the plurality of UL unified TCI states may be SSB, CSI-RS, or SRS.

A part of the DL unified TCI states set by the RRC is activated by the MAC CE as the DL unified TCI states. A part of the DL unified TCI states set by the RRC is activated by the MAC CE as the UL unified TCI state. A part of the UL unified TCI states set by the RRC is activated by the MAC CE as the UL unified TCI state. A part of the DL unified TCI states activated by MAC CE is instructed by DCI. A part of the UL unified TCI states activated by the MAC CE is instructed by the DCI.

However, it is not clear how to set/activate/instruct the TCI state. If the method of determining the TCI state is not clear, there is a possibility of causing a decrease in communication quality, a decrease in throughput, and the like.

Therefore, the present inventors have conceived a method of determining a TCI state.

Hereinafter, embodiments according to the present disclosure will be described in detail with reference to the drawings. Radio communication methods according to respective embodiments may be applied individually or in combination.

In the present disclosure, "A/B/C" and "at least one of A, B and C" are interchangeable. In the present disclosure, the cell, the CC, the carrier, the BWP, the DL BWP, the UL BWP, the active DL BWP, the active UL BWP, and the band may be replaced with each other. In the present disclosure, index, ID, indicator, and resource ID are interchangeable. In the present disclosure, "support", "control", "controllable", "operate", and "operable" are interchangeable.

In the present disclosure, "configure", "activate", "update", "indicate", "enable", "specify", and "select" are interchangeable.

In the present disclosure, MAC CE and activation/deactivation command are interchangeable.

In the present disclosure, the higher layer signaling may be any of, for example, Radio Resource Control (RRC) signaling, Medium Access Control (MAC) signaling, broadcast information, and the like, or a combination thereof. In the present disclosure, the RRC, the RRC signaling, the RRC parameter, the higher layer parameter, the RRC information element (IE), and the RRC message may be replaced with each other.

For example, a MAC Control Element (MAC CE), a MAC Protocol Data Unit (PDU), or the like may be used for the MAC signaling. The broadcast information may be, for example, a Master Information Block (MIB), a System Information Block (SIB), Remaining Minimum System Information (RMSI), Other System Information (OSI), or the like.

In the present disclosure, the beam, the spatial domain filter, the spatial setting, the TCI state, the UL TCI state, the unified TCI state, the QCL assumption, the QCL parameter, the spatial domain receive filter, the UE spatial domain receive filter, the UE receive beam, the DL beam, the DL receive beam, the DL precoding, the DL precoder, the DL-RS, the RS of the TCI state/QCL assumption QCL type D, the RS of the TCI state/QCL assumption QCL type A, the spatial relation, the spatial domain transmit filter, the UE spatial domain transmit filter, the UE transmit beam, the UL beam, the UL transmit beam, the UL precoding, the UL precoder, the PL-RS, may be replaced with each other. In the present disclosure, QCL type X-RS, DL-RS associated with QCL type X, DL-RS with QCL type X, DL-RS source, SSB, CSI-RS, and SRS are interchangeable.

The UL DCI, the DCI for scheduling the UL channel (PUSCH), and the DCI format 0_x (x=0, 1, 2, . . . ) may be replaced with each other. DL DCI, DCI for scheduling a DL channel (a PDSCH), and a DCI format 1_x (x=0, 1, 2, . . . ) may be replaced with each other.

Radio Communication Method

In the present disclosure, the pool, the set, the group, and the list may be replaced with each other.

First Embodiment

The UE may assume the same TCI state pool for UL and DL.

The Radio Resource Control (parameter, information element) may set a plurality of TCI states (pools) for the UL/DL channel.

The MAC CE may select (activate) one or more (for example, a plurality of) TCI states (sets) for the UL/DL channel.

The UL/DL DCI may select (instruct) one or more (for example, one) TCI states. This TCI state may be applied to a plurality of UL/DL channels. The UL/DL channel may be PDCCH/PDSCH/PUSCH/SRS/PUCCH.

The UL/DL DCI may include a new TCI field. The UL/DL DCI may be at least one of DCI formats 0_1, 0_2, 1_1, and 1_2. The new TCI field may select at least one of a plurality of active TCI states (for example, one).

In a case where the new TCI field exists in the DCI format 1_1, 1_2, the TCI field of Rel. 15/16 may not exist in the DCI format 1_1, 1_2.

That the new TCI field exists in the DCI may be set by a higher layer. The existence of the new DCI field in the UL DCI and the existence of the new DCI field in the DL DCI may be set independently (separately). The existence of the new DCI field in the UL DCI and the existence of the new DCI field in the DL DCI may be jointly set.

A size (the number of bits) of the TCI field may be the same or different in the UL DCI and the DL DCI. For example, the size of the TCI field in DL DCI may be greater than the size of the TCI field in UL DCI.

Figure 3:
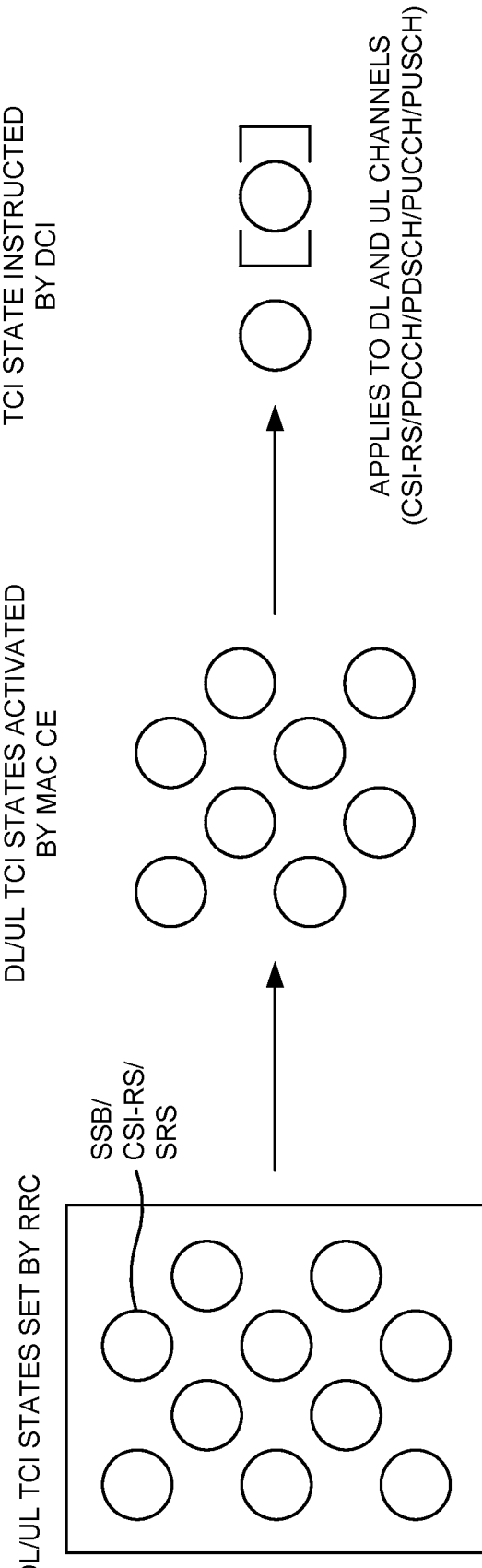
FIG. 3 is a diagram illustrating an example of a method of determining a TCI state according to a first embodiment.

In the example of FIG. 3, RRC sets a plurality of TCI states for DL and UL. Each of the plurality of TCI states may be an SSB, a CSI-RS, or an SRS. The MAC CE activates a part of the plurality of configured TCI states. The DCI instructs at least one of the plurality of activated TCI states.

The instructed TCI state is applied to the plurality of UL/DL channels. The UL/DL channel may be PDCCH/PDSCH/PUSCH/SRS/PUCCH.

According to the first embodiment described above, the TCI state set in one pool can be used for the UL and DL channels.

Second Embodiment

The UE may assume different TCI state pools for each of UL and DL.

The Radio Resource Control (parameter, information element) may set a plurality of TCI states (pools) for each of the UL and DL channels.

The MAC CE may select (activate) one or more (for example, a plurality of) TCI states (sets) for each of the UL and DL channels. The MAC CE may activate two sets of TCI states.

The DL DCI may select (instruct) one or more (for example, one) TCI states. This TCI state may be applied to one or more DL channels. The DL channel may be PDCCH/PDSCH/CSI-RS.

The UL DCI selects (instruct) one or more (for example, one) TCI states. This TCI state may be applied to one or more UL channels. The UL channel may be a PUSCH/SRS/PUCCH.

The UL/DL DCI may include a new TCI field. The UL/DL DCI may be at least one of DCI formats 0_1, 0_2, 1_1, and 1_2. The new TCI field may select at least one of a plurality of active TCI states (for example, one).

In a case where the new TCI field exists in the DCI format 1_1, 1_2, the TCI field of Rel. 15/16 may not exist in the DCI format 1_1, 1_2. In the DCI formats 1_1 and 1_2, there may be no new TCI field. The existing TCI field may be reused for instructing the TCI state in this embodiment.

That the new TCI field exists in the DCI may be set by a higher layer. The existence of the new DCI field in the UL DCI and the existence of the new DCI field in the DL DCI may be set independently (separately). The existence of the new DCI field in the UL DCI and the existence of the new DCI field in the DL DCI may be jointly set.

A size (the number of bits) of the TCI field may be the same or different in the UL DCI and the DL DCI. For example, the size of the TCI field in DL DCI may be greater than the size of the TCI field in UL DCI.

Figures 4A, 4B:
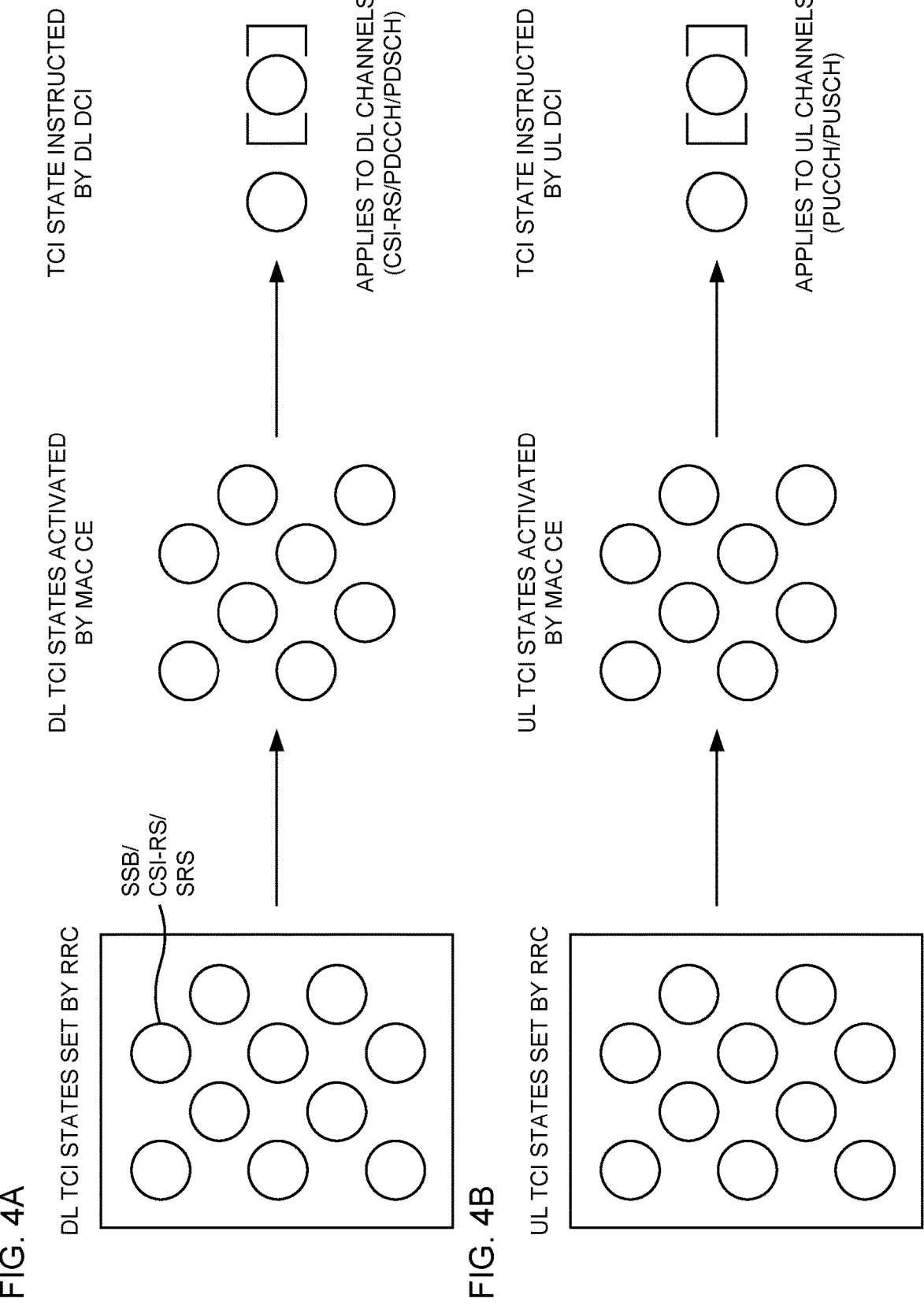
FIGS. 4A and 4B are diagrams illustrating an example of a method of determining a TCI state according to a second embodiment.

In the example of FIG. 4A, the RRC sets a plurality of TCI states for DL. Each of the TCI state may be SSB, CSI-RS, or SRS. The MAC CE activates a plurality of TCI states for DL in the plurality of configured TCI states for DL. The DL DCI instructs at least one of a plurality of TCI states for the activated DL. The instructed TCI state for DL is applied to the DL channel. The DL channel may be CSI-RS/PDCCH/PDSCH.

In the example of FIG. 4B, the RRC sets a plurality of TCI states for the UL. Each of the TCI state may be SSB, CSI-RS, or SRS. The MAC CE activates a plurality of TCI states for the UL in the plurality of configured TCI states for the UL. The UL DCI instructs at least one of a plurality of TCI states for the activated UL. The instructed TCI state for the UL applies to the UL channel. The UL channel may be PUCCH/PUSCH.

Modification Example 1

The RRC may set a pool of TCI states common to the UL and the DL. One or more DL TCI states and one or more UL TCI states may be activated from the common pool.

Figure 5:
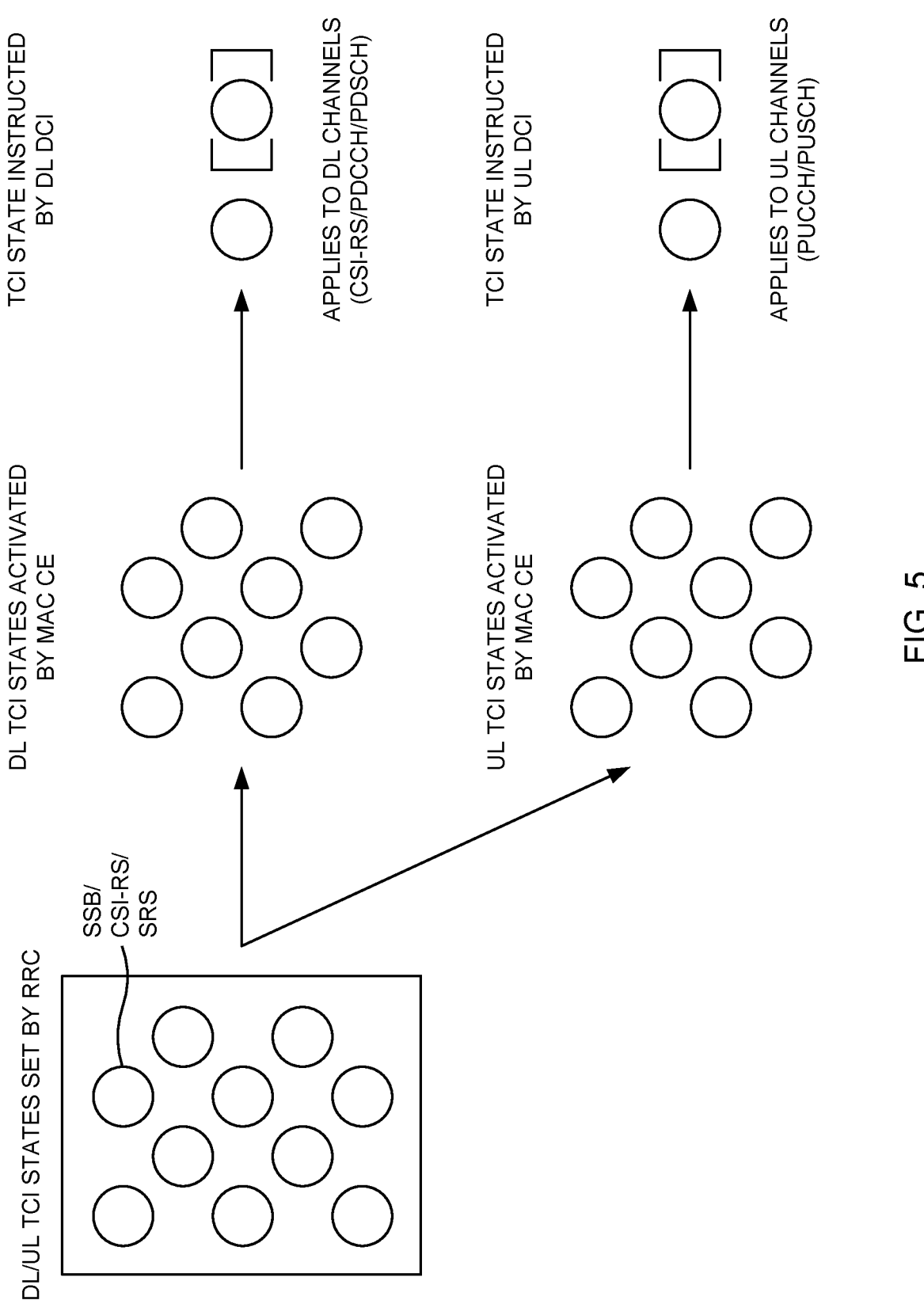
FIG. 5 is a diagram illustrating an example of a method of determining a TCI state according to a first modification example of the second embodiment.

In the example of FIG. 5, the RRC sets a plurality of TCI states for DL and UL. Each of the TCI state may be SSB, CSI-RS, or SRS.

The first MAC CE activates a plurality of TCI states for DL in the plurality of configured TCI states. The DL DCI instructs at least one of a plurality of TCI states for the activated DL. The instructed TCI state for DL is applied to the DL channel. The DL channel may be CSI-RS/PDCCH/PDSCH.

The second MAC CE activates a plurality of TCI states for the UL in the plurality of configured TCI states. The UL DCI instructs at least one of a plurality of TCI states for the activated UL. The instructed TCI state for the UL applies to the UL channel. The UL channel may be PUCCH/PUSCH.

Modification Example 2

One or more DL TCI states and one or more UL TCI states may be independently instructed from the plurality of activated TCI states. The UL DCI and DL DCI may instruct different TCI states.

Figure 6:
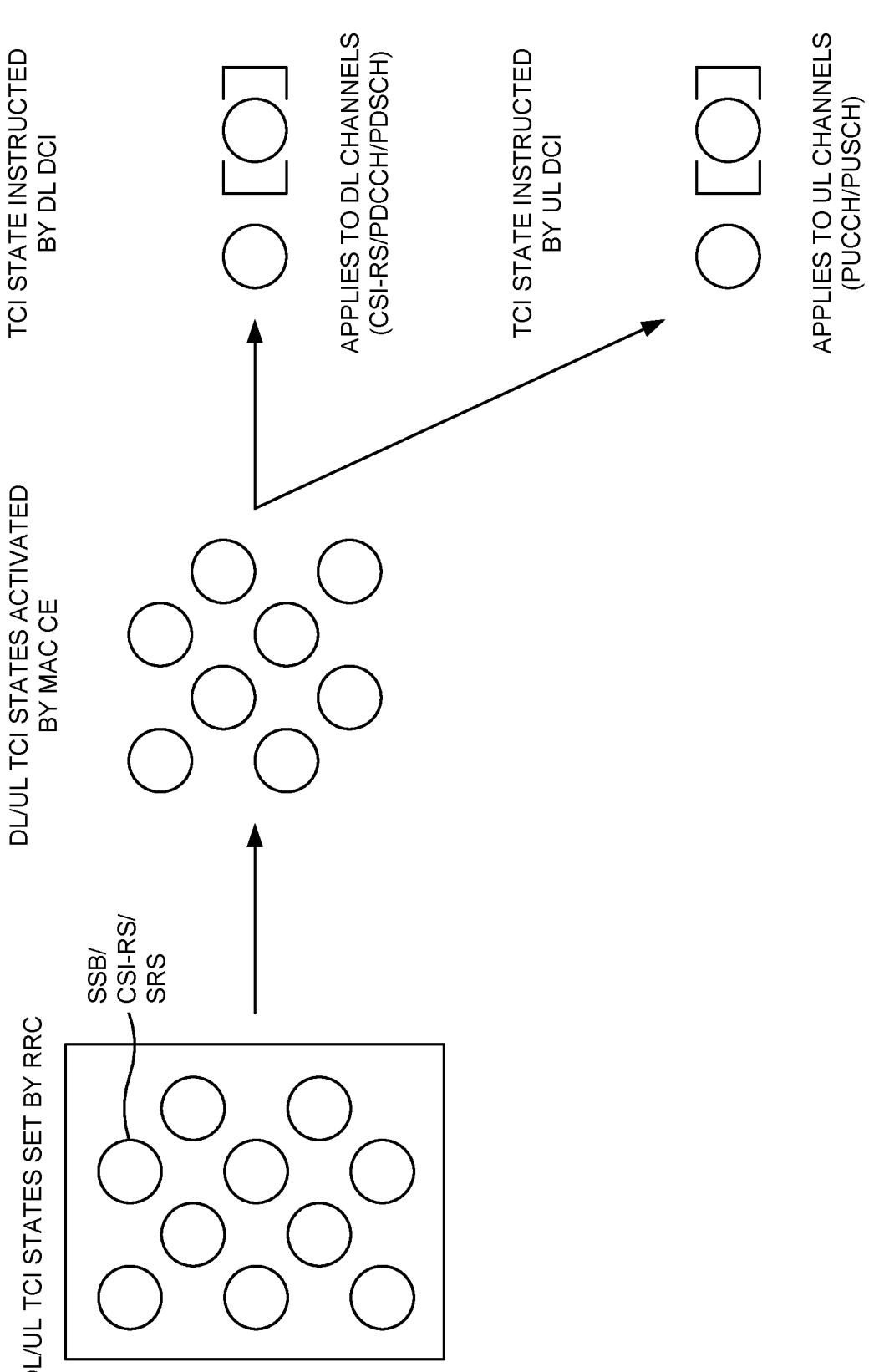
FIG. 6 is a diagram illustrating an example of a method of determining a TCI state according to a second modification example of the second embodiment.

In the example of FIG. 6, the RRC sets a plurality of TCI states for DL and UL. Each of the TCI state may be SSB, CSI-RS, or SRS. The MAC CE activates a plurality of TCI states in the plurality of configured TCI states.

The DL DCI instructs at least one TCI state for DL of the plurality of activated TCI states. The instructed TCI state for DL is applied to the DL channel. The DL channel may be CSI-RS/PDCCH/PDSCH.

The UL DCI instructs at least one UL TCI state of the plurality of activated TCI states. The instructed TCI state for the UL applies to the UL channel. The UL channel may be PUCCH/PUSCH.

According to the second embodiment described above, the TCI state for DL and the TCI state for UL can be appropriately determined.

Third Embodiment

The UE may fail to receive the DCI. In the first and second embodiments, in a case where a UL/DL beam is instructed by the DCI and the reception of the DCI fails, a beam discrepancy occurs between the UE and the base station.

In particular, in a case where there is beam inconsistency of DCI (PDCCH), communication becomes difficult.

A HARQ-ACK for the DCI instruction may be introduced. The UE may transmit the ACK when detecting the DCI including the TCI field. The UE may then update the UL/DL beams (after a waiting time from the transmission of the ACK). The waiting time may be K symbols/K slots.

The HARQ-ACK for the DCI instruction may not be introduced.

In a case where the UE receives the UL DCI instructing the beam, the UE may transmit the PUSCH scheduled by the UL DCI (in a similar manner to Rel. 15) and update the UL/DL beam after the waiting time from the transmission of the PUSCH (for example, a start symbol or an end symbol). The waiting time may be K symbols/K slots.

In a case where the UE receives DL DCI instructing a beam, the UE may transmit HARQ-ACK information corresponding to the PDSCH scheduled by the DL DCI (in a similar manner to Rel. 15) and update the UL/DL beam after a waiting time from the transmission of the HARQ-ACK information (for example, a start symbol or an end symbol). The HARQ-ACK information may be ACK or NACK. The waiting time may be K symbols/K slots.

K may be specified in a specification, may be configured by the RRC, or may be reported from the UE by UE capability.

In a case where the reception of the DCI including the new TCI field fails, and in case where no ACK or NACK or PUSCH is transmitted, the UE may not update the UL/DL beam (may maintain a beam prior to the DCI).

According to the third embodiment described above, the recognition of the DL/UL beams can be matched between the UE and the base station.

Fourth Embodiment

UE capability corresponding to at least one function (feature) in the first to third embodiments may be prescribed. In a case where the UE has reported the UE capability, the UE may perform the corresponding function. In a case where the UE has reported the UE capability and is configured with a higher layer parameter corresponding to this function, the UE may perform the corresponding function. A higher layer parameter (RRC information element) corresponding to this function may be defined. In a case where the higher layer parameter is configured, the UE may perform the corresponding function.

The UE capability may indicate whether the UE supports this function.

The UE capability may indicate a maximum number of TCI states supported by the UE and configured by the RRC. The maximum number of TCI states set by the RRC may be the maximum number of TCI states set for all of the UL and the DL. The maximum number of TCI states configured by the RRC may be that the maximum number of TCI states configured for the UL and the maximum number of TCI states configured for the DL are reported independently.

The UE capability may indicate a maximum number of active TCI states supported by the UE. The maximum number of active TCI states may be the maximum number of active TCI states for all of the UL and DL. As the maximum number of active TCI states, the maximum number of active TCI states for the UL and the maximum number of active TCI states for the DL may be reported independently.

The UE capability may indicate whether or not the UE supports different active TCI state pools for UL and DL.

According to the fourth embodiment described above, the UE can realize at least one function in the first to third embodiments while maintaining compatibility with the existing specifications.

Radio Communication System

Hereinafter, a configuration of a radio communication system according to one embodiment of the present disclosure will be described. In this radio communication system, communication is performed using any one of the radio communication methods according to the embodiments of the present disclosure or a combination thereof.

Figure 7:
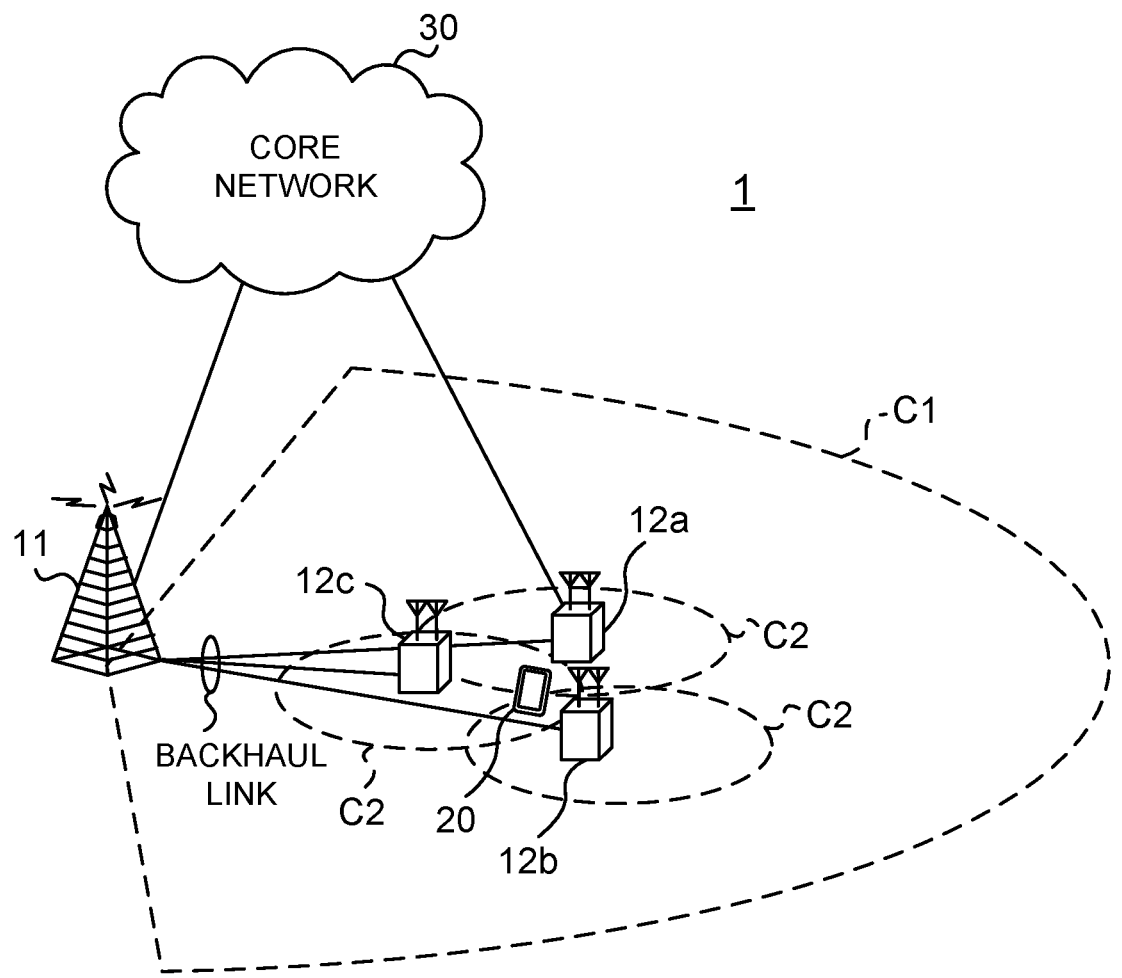
FIG. 7 is a diagram illustrating an example of a schematic configuration of a radio communication system according to one embodiment.

FIG. 7 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In the NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in a first Frequency Range 1 (FR1) and/or a second Frequency Range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency bands, definitions, and the like of the FR1 and FR2 are not limited thereto, and, for example, the FR1 may correspond to a frequency band higher than the FR2.

Further, the user terminal 20 may perform communication in each CC by using Time Division Duplex (TDD) and/or Frequency Division Duplex (FDD).

The plurality of base stations 10 may be connected in a wired (e.g., an optical fiber or an X2 interface in compliance with common public radio interface (CPRI)) or wireless manner (e.g., NR communication). For example, in a case where NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an Evolved Packet Core (EPC), a 5G Core Network (SGCN), or a Next Generation Core (NGC), or the like.

The user terminal 20 may a terminal that corresponds to at least one of communication methods such as LTE, LTE-A, and 5G.

In the radio communication system 1, a radio access scheme based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like, may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH), a physical broadcast channel (PBCH), a physical downlink control channel (PDCCH), or the like, shared by the user terminals 20 may be used.

Further, in the radio communication system 1, as an uplink channel, a physical uplink shared channel (PUSCH), a physical uplink control channel (PUCCH), a physical random access channel (PRACH), or the like, shared by the user terminals 20 may be used.

User data, higher layer control information, a system information block (SIB), and the like are transmitted on the PDSCH. The PUSCH may transmit the user data, higher layer control information, and the like. Furthermore, a master information block (MIB) may be transmitted on the PBCH.

Lower layer control information may be transmitted by the PDCCH. The lower layer control information may include, for example, Downlink Control Information (DCI) including scheduling information of at least one of the PDSCH or the PUSCH.

Note that the DCI that schedules the PDSCH may be referred to as DL assignment, DL DCI, or the like, and the DCI that schedules PUSCH may be referred to as UL grant, UL DCI, or the like. Note that PDSCH is interchangeable with DL data, and PUSCH is interchangeable with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space based on search space configuration.

One search space may correspond to a PDCCH candidate corresponding to one or more aggregation levels. One or more search spaces may be referred to as a search space set. Note that "search space" and "search space set", "search space configuration", "search space set configuration", "CORESET" and "CORESET configuration", and the like, in the present disclosure are interchangeable.

Uplink Control Information (UCI) including at least one of Channel State Information (CSI), delivery acknowledgement information (which may be referred to as, for example, a Hybrid Automatic Repeat reQuest ACKnowledgement (HARQ-ACK), ACK/NACK, or the like), or a Scheduling Request (SR) may be transmitted by the PUCCH. A random access preamble for establishing connection with a cell may be transmitted on the PRACH.

Note that in the present disclosure, downlink, uplink, and the like may be expressed without "link". Various channels may also be expressed without adding "physical" in front of the channels.

In the radio communication system 1, a synchronization signal (SS), a downlink reference signal (DL-RS), and the like, may be transmitted. In the radio communication system 1, a Cell-Specific Reference Signal (CRS), a Channel State Information Reference Signal (CSI-RS), a DeModulation Reference Signal (DMRS), a Positioning Reference Signal (PRS), a Phase Tracking Reference Signal (PTRS), or the like, may be transmitted as the DL-RS.

The synchronization signal may be, for example, at least one of a Primary Synchronization Signal (PSS) and a Secondary Synchronization Signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, DMRSs may be referred to as "user terminal-specific reference signals (UE-specific Reference Signals)".

Base Station

Figure 8:
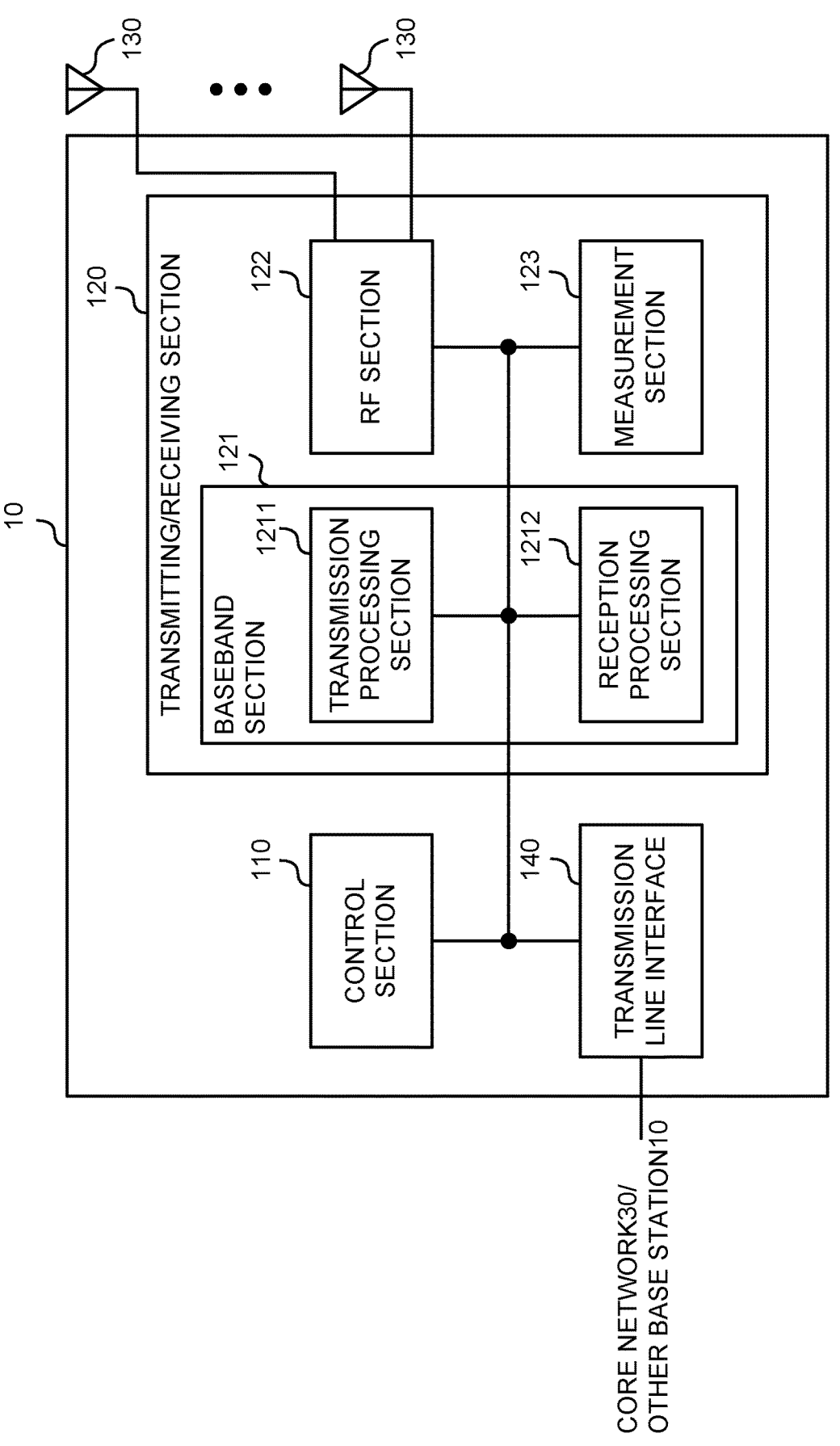
FIG. 8 is a diagram illustrating an example of a configuration of a base station according to one embodiment.

FIG. 8 is a diagram illustrating an example of a configuration of the base station according to one embodiment. The base station 10 includes a control section 110, a transmitting/ receiving section 120, a transmitting/receiving antenna 130, and a transmission line interface 140. Note that one or more control sections 110, transmitting/receiving sections 120, transmitting/receiving antennas 130, and transmission line interfaces 140, respectively, may also be provided.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be constituted by a controller, a control circuit, and the like that are described based on common understanding in the technical field according to the present disclosure.

The control section 110 may control signal generation, scheduling (for example, resource allocation or mapping), and the like. The control section 110 may control transmission/reception, measurement, and the like using the transmitting/receiving section 120, the transmitting/receiving antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmitting/receiving circuit, and the like, which are described based on common understanding in the technical field pertaining to the present disclosure.

The transmitting/receiving section 120 may be configured as an integrated transmitting/receiving section or may be configured by a transmitting section and a receiving section. The transmitting section may include the transmission processing section 1211 and the RF section 122. The receiving section may be implemented by the reception processing section 1212, the RF section 122, and the measurement section 123.

The transmitting/receiving antenna 130 can be constituted by an antenna, for example, an array antenna or the like, which is described based on common understanding in the technical field according to the present disclosure.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, on, for example, data, control information, and the like, acquired from the control section 110, to generate a bit string to be transmitted.

The transmitting/receiving section 120 (transmission processing section 1211) may perform transmission processing such as channel encoding (which may include error correcting coding), modulation, mapping, filtering processing, Discrete Fourier Transform (DFT) processing (if necessary), Inverse Fast Fourier Transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like, on the baseband signal and may transmit a signal in the radio frequency band via the transmitting/receiving antenna 130.

Meanwhile, the transmitting/receiving section 120 (RF section 122) may perform amplification, filtering processing, demodulation to a baseband signal, and the like on the signal in the radio frequency band received by the transmitting/receiving antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data, and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be outputted to the control section 110.

The transmission line interface 140 may transmit/receive a signal (backhaul signaling) to and from an apparatus included in the core network 30, another base stations 10, and the like, and may acquire, transmit, and the like, user data (user plane data), control plane data, and the like, for the user terminal 20.

Note that the transmitting section and the receiving section of the base station 10 in the present disclosure may include at least one of the transmitting/receiving section 120, the transmitting/receiving antenna 130, or the transmission line interface 140.

The transmitting/receiving section 120 may transmit a list of transmission configuration indication (TCI) states applicable to the downlink and the uplink. The control section 110 may control transmission of one or more medium access control-control elements (MAC CEs) for determining one or more sets of active TCI states from the list, and transmission of downlink control information (DCI) for determining one or more TCI states to be applied to at least one of downlink and uplink signals from the one or more sets.

User Terminal

Figure 9:
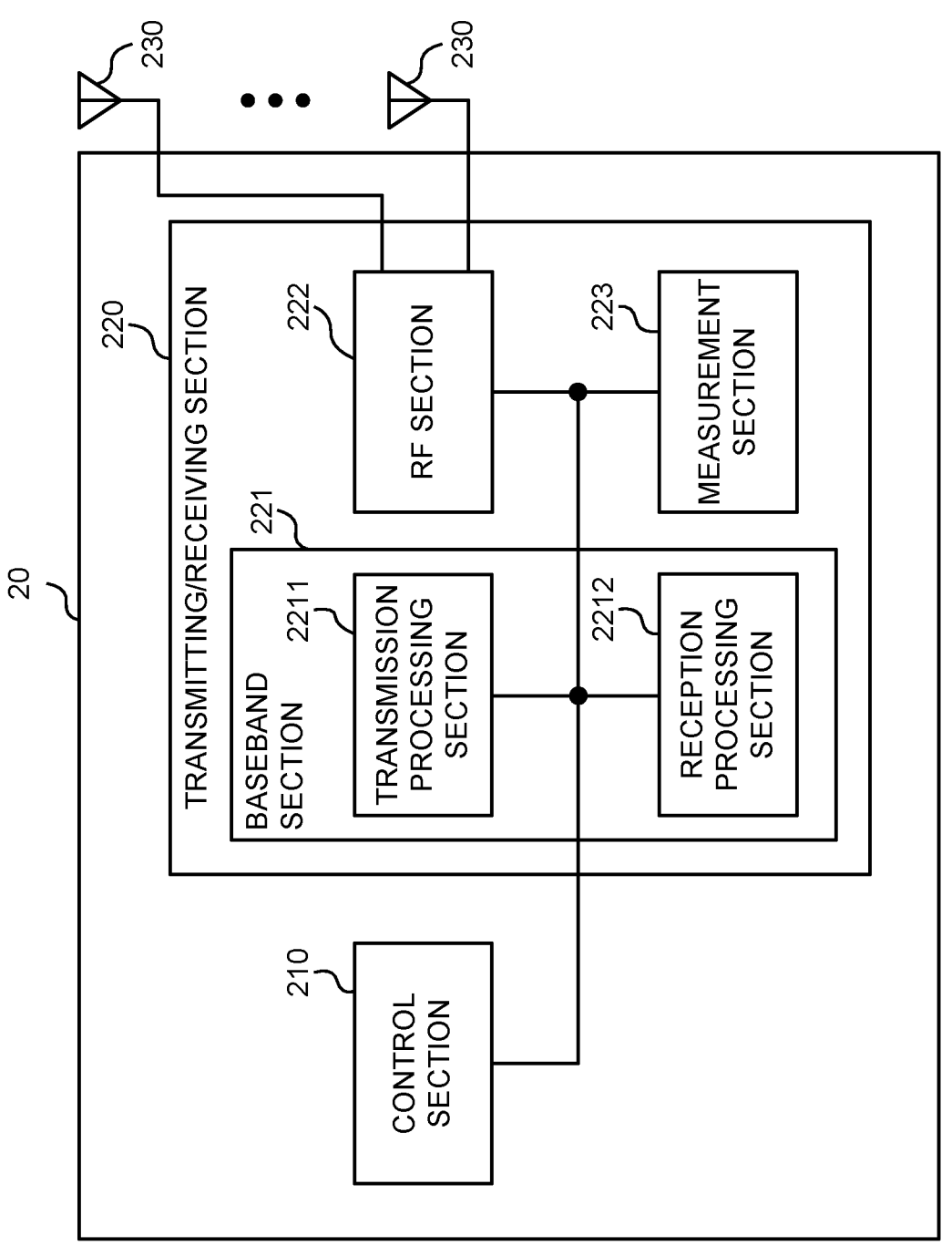
FIG. 9 is a diagram illustrating an example of a configuration of a user terminal according to one embodiment.

FIG. 9 is a diagram illustrating an example of a configuration of the user terminal according to one embodiment.

The user terminal 20 includes a control section 210, a transmitting/receiving section 220, and a transmitting/receiving antenna 230. Note that, one or more each of the control sections 210, the transmitting/receiving sections 220, and the transmitting/receiving antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data, control information, a sequence, and the like to be transmitted as signals, and may transfer the data, control information, sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmitting/receiving circuit, and the like that are described on the basis of common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmitting/receiving antenna 230 can include an antenna described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that, whether or not to apply DFT processing may be determined on the basis of configuration of transform precoding. When the transform precoding is enabled for a channel (for example, PUSCH), the transmitting/receiving section 220 (transmission processing section 2211) may perform DFT processing as the transmission processing to transmit the channel by using a DFT-s-OFDM waveform, and when not, DFT processing does not have to be performed as the transmission processing.

The transmitting/receiving section 220 (RF section 222) may perform modulation to a radio frequency range, filtering processing, amplification, and the like on the baseband signal, to transmit a signal in the radio frequency range via the transmitting/receiving antenna 230.

Meanwhile, the transmitting/receiving section 220 (RF section 222) may perform amplification, filtering processing, demodulation to a baseband signal, and the like on the signal in the radio frequency range received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220 and the transmitting/receiving antenna 230.

The transmitting/receiving section 220 may receive a list of transmission configuration indication (TCI) states applicable to the downlink and the uplink. The control section 210 may determine one or more sets of active TCI states from the list on the basis of one or more medium access control-control elements (MAC CEs), and determine one or more TCI states to be applied to at least one of downlink and uplink signals from the one or more sets on the basis of downlink control information (DCI).

The control section 210 may apply the TCI state instructed by the DCI to the signal after the uplink channel is transmitted based on the DCI.

In a case where the DCI schedules a downlink shared channel, the control section 210 may apply the TCI state instructed by the DCI to a downlink signal. In a case where the DCI schedules the uplink shared channel, the control section 210 may apply the TCI state instructed by the DCI to the uplink signal.

In a case where the DCI schedules the downlink shared channel, the control section 210 may apply the TCI state instructed by the DCI, of the first set activated by the first MAC CE, to a downlink signal. In a case where the DCI schedules the uplink shared channel, the control section 210 may apply the TCI state instructed by the DCI, of the second set activated by the second MAC CE, to the uplink signal.

Hardware Configuration

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be implemented by combining the one apparatus or the plurality of apparatuses with software.

Here, the function includes, but is not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 10:
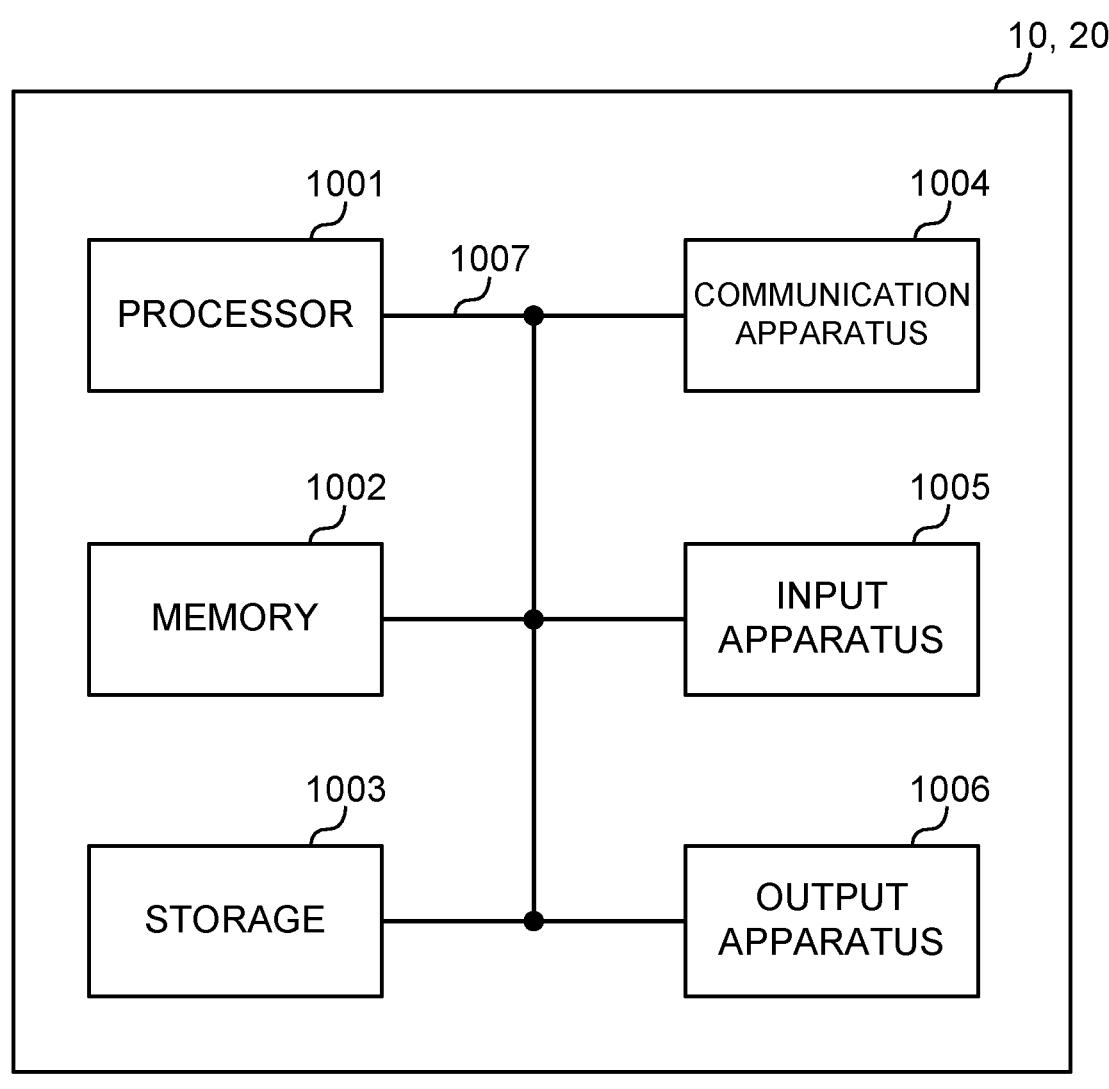
FIG. 10 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 10 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that, in the present disclosure, terms such as apparatus, circuit, device, section, or unit are interchangeable. The hardware configuration of the base station 10 and the user terminal 20 may be designed to include one or more of the apparatuses illustrated in the drawings, or may be designed not to include some apparatuses.

For example, although only one processor 1001 is illustrated, a plurality of processors may be provided. Further, the processing may be executed by one processor, or the processing may be executed by two or more processors simultaneously or sequentially, or using other methods. Note that the processor 1001 may be implemented with one or more chips.

Each function of the base station 10 and the user terminal 20 is implemented by certain software (program) being read on hardware such as the processor 1001 and the memory 1002, by which the processor 1001 performs operations, controlling communication via the communication apparatus 1004, and controlling at least one of reading or writing of data from/to the memory 1002 and the storage 1003.

The processor 1001 may control the whole computer by, for example, running an operating system. The processor 1001 may be implemented by a central processing unit (CPU) including an interface with peripheral equipment, a control apparatus, an operation apparatus, a register, and the like. For example, at least part of the above-described control section 110 (210), transmitting/receiving section 120 (220), and the like may be implemented by the processor 1001.

The processor 1001 reads programs (program codes), software modules, data, etc. from at least one of the storage 1003 or the communication apparatus 1004 into the memory 1002, and performs various types of processing according to these. As the program, a program that causes a computer to execute at least a part of the operation described in the above-described embodiment is used. For example, the control section 110 (210) may be implemented by a control program that is stored in the memory 1002 and that operates in the processor 1001, and other functional blocks may be similarly implemented.

The memory 1002 is a computer-readable recording medium, and may be constituted by, for example, at least one of a Read Only Memory (ROM), an Erasable Programmable ROM (EPROM), an Electrically EPROM (EEPROM), a Random Access Memory (RAM), or other appropriate storage media. The memory 1002 may be referred to as a register, a cache, a main memory (primary storage apparatus), and the like. The memory 1002 can store programs (program codes), software modules, etc. that are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM), and the like), a digital versatile disk, a Blu-ray (registered trademark) disk, a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus".

The communication apparatus 1004 is hardware (transmitting/receiving device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmitting/receiving antenna 130 (230), and the like described above may be implemented by the communication apparatus 1004. The transmitting/receiving section 120 (220) may be implemented by being physically or logically separated into the transmitting section 120a (220a) and the receiving section 120b (220b).

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Further, the base station 10 and the user terminal 20 may be constituted to include hardware such as a microprocessor, a Digital Signal Processor (DSP), an Application Specific Integrated Circuit (ASIC), a Programmable Logic Device (PLD), or a Field Programmable Gate Array (FPGA), and some or all of the functional blocks may be realized by using the hardware. For example, the processor 1001 may be implemented with at least one of these pieces of hardware.

Variations

Note that terms described in the present disclosure and terms necessary for understanding the present disclosure may be replaced with terms that have the same or similar meanings. For example, a channel, a symbol, and a signal (signal or signaling) may be replaced with each other. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may be constituted with one or more periods (frames) in a time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for transmission and/or reception of a certain signal or channel. For example, the numerology may indicate at least one of SubCarrier Spacing (SCS), a bandwidth, a symbol length, a cyclic prefix length, a Transmission Time Interval (TTI), the number of symbols per TTI, a radio frame configuration, specific filter processing performed by a transceiver in the frequency domain, or specific windowing processing performed by a transceiver in the time domain.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

A slot may include a plurality of mini slots. Each mini slot may include one or more symbols in the time domain. Further, the mini slot may be referred to as a sub-slot. Each mini slot may include fewer symbols than the slot. A PDSCH (or PUSCH) transmitted in a time unit larger than the mini slot may be referred to as "PDSCH (PUSCH) mapping type A". A PDSCH (or a PUSCH) to be transmitted using a mini slot may be referred to as "PDSCH (PUSCH) mapping type B".

A radio frame, a subframe, a slot, a mini slot and a symbol all represent the time unit in signal communication. The radio frame, the subframe, the slot, the mini slot, and the symbol may be called by other applicable names, respectively. Note that time units such as frame, subframe, slot, mini slot, and symbol in the present disclosure are interchangeable.

For example, one subframe may be referred to as TTI, a plurality of consecutive subframes may be referred to as TTI, or one slot or one mini slot may be referred to as TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot" and so on, instead of a "subframe".

Here, a TTI refers to the minimum time unit of scheduling in radio communication, for example. For example, in the LTE system, a base station performs scheduling to allocate radio resources (a frequency bandwidth, transmission power, and the like that can be used in each user terminal) to each user terminal in TTI units. Note that the definition of TTIs is not limited to this.

The TTI may be a transmission time unit of a channel-coded data packet (transport block), a code block, a code-word, and the like, or may be a processing unit of scheduling, link adaptation, and so on. When the TTI is given, a time interval (e.g., the number of symbols) to which a transport block, a code block, a codeword, or the like, is actually mapped may be shorter than the TTI.

Note that, when one slot or one mini slot is referred to as a "TTI", one or more TTIs (that is, one or multiple slots or one or more mini slots) may be the minimum time unit of scheduling. Also, the number of slots (the number of mini slots) to constitute this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than a usual TTI may be referred to as a shortened TTI, a short TTI, a partial TTI (a partial TTI or a fractional TTI), a shortened subframe, a short subframe, a mini slot, a sub-slot, a slot, and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in an RB may be determined based on a numerology.

Also, an RB may include one or more symbols in the time domain, and may be one slot, one mini slot, one subframe or one TTI in length. One TTI, one subframe, etc. may each be constituted with one or more resource blocks.

Note that one or more RBs may be referred to as a Physical Resource Block (PRB), a Sub-Carrier Group (SCG), a Resource Element Group (REG), a PRB pair, an RB pair, and so on.

Furthermore, a resource block may be constituted by one or more Resource Elements (REs). For example, one RE may be a radio resource field of one subcarrier and one symbol.

A bandwidth part (BWP) (which may be referred to as a partial bandwidth, or the like) may represent a subset of contiguous common resource blocks (RBs) for a certain numerology in a certain carrier. Here, the common RB may be specified by the index of the RB based on a common reference point of the carrier. PRBs may be defined in a BWP and numbered within the BWP.

The BWP may include a UL BWP (BWP for UL) and a DL BWP (BWP for DL). For the UE, one or more BWPs may be configured within one carrier.

At least one of the configured BWPs may be active, and it need not be assumed that the UE transmits/receives a certain signal/channel outside the active BWP. Note that "cell", "carrier", etc. in the present disclosure may be replaced with "BWP".

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

The information, parameters, etc. described in the present disclosure may be represented using absolute values, or may be represented using relative values with respect to certain values, or may be represented using other corresponding information. For example, a radio resource may be specified by a certain index.

The names used for parameters and so on in the present disclosure are in no respect limiting. Further, any mathematical expression or the like that uses these parameters may differ from those explicitly disclosed in the present disclosure. Because various channels (PUCCH, PDCCH, and the like) and information elements can be identified by any suitable names, various names allocated to these various channels and information elements are not restrictive names in any respect.

The information, signals, etc. described in the present disclosure may be represented using any of a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals, etc. can be output in at least one of a direction from a higher layer to a lower layer or a direction from a lower layer to a higher layer. Information, signals and so on may be input and output via a plurality of network nodes.

The information, signals and so on that are input and/or output may be stored in a specific location (for example, in a memory), or may be managed in a control table. The information, signals, and the like to be input and output can be overwritten, updated, or appended. The output information, signals, and the like may be deleted. The information, signals and so on that are input may be transmitted to other pieces of apparatuses.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and so on. Further, the RRC signaling may be referred to as an RRC message, and may be, for example, an RRC Connection Setup message, an RRC Connection Reconfiguration message, and so on. Further, notification of the MAC signaling may be performed using, for example, an MAC control element (CE).

Also, reporting of certain information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a certain value).

Software, whether referred to as "software", "firmware", "middleware", "microcode", or "hardware description language", or called by other names, should be interpreted broadly, to mean instructions, instruction sets, codes, code segments, program codes, programs, subprograms, software modules, applications, software applications, software packages, routines, subroutines, objects, executable files, execution threads, procedures, functions, and the like.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "Quasi-Co-Location (QCL)", "Transmission Configuration Indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" may be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station is sometimes referred to using terms such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of the base station and/or the base station subsystem that performs a communication service in this coverage.

As used in the present disclosure, the terms such as "mobile station (MS)", "user terminal", "user equipment (UE)", and "terminal" may be used interchangeably.

The mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable term.

At least one of the base station or the mobile station may be called as a transmission device, a reception device, a radio communication device, and the like. Note that at least one of the base station or the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, base station in the present disclosure is interchangeable with user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, an uplink channel and a downlink channel may be read as a side channel.

Likewise, the user terminals in the present disclosure may be interpreted as base stations. In this case, the base stations 10 may have the functions of the user terminals 20 described above.

In the present disclosure, an operation performed by the base station may also be performed by an upper node thereof in some cases. In a network including one or more network nodes with base stations, it is clear that various kinds of operation performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, although various methods have been described in the present disclosure with various components of steps using exemplary orders, the specific orders that are described herein are by no means limiting.

Each aspect/embodiment described in the present disclosure may be applied to a system using Long-Term Evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (xG(x is, for example, an integer or decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next-generation system expanded on the basis of the foregoing, and the like. Further, a plurality of systems may be combined (for example, a combination of LTE or LTE-A and 5G, and the like) and applied.

The phrase "based on" as used in the present disclosure does not mean "based only on", unless otherwise specified. In other words, the phrase "based on" means both "based only on" and "based at least on".

All references to the elements using designations such as "first" and "second" as used in the present disclosure do not generally limit the amount or sequence of these elements. These designations can be used in the present disclosure, as a convenient way of distinguishing between two or more elements. In this way, reference to the first and second elements does not imply that only two elements may be employed, or that the first element must precede the second element in some way.

The term "discriminating (determining)" as used in the present disclosure may include a wide variety of actions. For example, "determining" may be regarded as "determining" judging, calculating, computing, processing, deriving, investigating, looking up (or searching or inquiring) (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

Furthermore, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

Furthermore, "determining" as used herein may be interpreted to mean "assuming", "expecting", "considering" and so on.

The "maximum transmission power" described in the present disclosure may mean the maximum value of the transmission power, the nominal maximum transmission power (nominal UE maximum transmit power), or the rated maximum transmission power (rated UE maximum transmit power).

The terms "connected" and "coupled" used in the present disclosure, or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency domain, microwave region, or optical (both visible and invisible) region, or the like.

In the present disclosure, the terms "A and B are different" may mean "A and B are different from each other". Note that the phrase may mean that "A and B are different from C". The terms such as "separate", "coupled", and the like may be interpreted similarly to "different".

When "include", "including", and variations of these are used in the present disclosure, these terms are intended to be inclusive similarly to the term "comprising". Moreover, the term "or" used in the present disclosure is intended to be not an exclusive-OR.

In the present disclosure, when articles are added by translation, for example, as "a", "an", and "the" in English, the present disclosure may include that nouns that follow these articles are plural.

In the above, the invention according to the present disclosure has been described in detail; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

The present application is based on Japanese Patent Application No. 2020-144803 filed on Aug. 28, 2020. The contents of this are all incorporated herein.

The invention claimed is:

1. A terminal comprising:
   a receiver that receives a list of unified Transmission Configuration Indication (TCI) states applicable to downlink and uplink; and
   a processor that determines, based on a Medium Access Control-Control Element (MAC CE), active TCI states from the list, and determines, based on Downlink Control Information (DCI) scheduling a Physical Downlink Shared Channel (PDSCH), a TCI state applied to downlink and uplink out of the active TCI states,
   wherein the processor updates the TCI state after K symbols from transmission of a Hybrid Automatic Repeat reQuest-ACKnowledgement (HARQ-ACK) information for the DCI.

2. The terminal according to claim 1, wherein the receiver receives a list of unified TCI states commonly configured for downlink and uplink by using a first higher layer signaling.

3. The terminal according to claim 1, wherein the receiver receives a first list of unified TCI states configured for downlink by using a first higher layer signaling, and receives a second list of unified TCI states configured for uplink by using a second higher layer signaling.

4. The terminal according to claim 1, further comprising:
   a transmitter that, when the receiver receives the DCI indicating a given TCI state, transmits HARQ-ACK information for the DCI.

5. The terminal according to claim 1, further comprising a transmitter that reports capability information indicating support of a function of a unified TCI state applicable to downlink and uplink.

6. A radio communication method for a terminal, comprising:
   receiving a list of unified Transmission Configuration Indication (TCI) states applicable to downlink and uplink; and
   determining, based on a Medium Access Control-Control Element (MAC CE), active TCI states from the list, and determining, based on Downlink Control Information (DCI) scheduling a Physical Downlink Shared Channel (PDSCH), a TCI state applied to downlink and uplink out of the active TCI states; and
   updating the TCI state after K symbols from transmission of a Hybrid Automatic Repeat reQuest-ACKnowledgement (HARQ-ACK) information for the DCI.

7. A base station comprising:
   a transmitter that transmits a list of unified Transmission Configuration Indication (TCI) states applicable to downlink and uplink; and
   a processor that controls transmission of a Medium Access Control-Control Element (MAC CE) based on which one or more sets of active TCI states are determined from the list, and controls transmission of Downlink Control Information (DCI) scheduling a Physical Downlink Shared Channel (PDSCH) based on which a TCI state applied to downlink and uplink is determined out of the active TCI states,
   wherein the processor controls transmission indicating updating the TCI state after K symbols from transmission of a Hybrid Automatic Repeat reQuest-ACKnowledgement (HARQ-ACK) information for the DCI.

8. A system comprising a terminal and a base station, wherein:
   the terminal comprises:
      a receiver that receives a list of unified Transmission Configuration Indication (TCI) states applicable to downlink and uplink; and
      a processor that determines, based on a Medium Access Control-Control Element (MAC CE), active TCI states from the list, and determines, based on Downlink Control Information (DCI) scheduling a Physical Downlink Shared Channel (PDSCH), a TCI state applied to downlink and uplink out of the active TCI states,
      wherein the processor updates the TCI state after K symbols from transmission of a Hybrid Automatic Repeat reQuest-ACKnowledgement (HARQ-ACK) information for the DCI, and
   the base station comprises:
      a transmitter that transmits the list.

* * * * *